(12) United States Patent
Bansal et al.

(10) Patent No.: US 7,689,674 B2
(45) Date of Patent: Mar. 30, 2010

(54) SELECTIVE EXCLUSION OF LSPS ON A PER-PACKET BASIS

(75) Inventors: Deepak Bansal, Redmond, WA (US); Eric B. Stenson, Redmond, WA (US); Khawar M. Zuberi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1399 days.

(21) Appl. No.: 11/094,431

(22) Filed: Mar. 31, 2005

(65) Prior Publication Data

US 2006/0224749 A1    Oct. 5, 2006

(51) Int. Cl.
*G06F 15/177*    (2006.01)
*G06F 15/16*    (2006.01)

(52) U.S. Cl. .................... 709/220; 709/229

(58) Field of Classification Search ............ 709/228, 709/220, 229
See application file for complete search history.

(56) References Cited

U.S. PATENT DOCUMENTS

| | | | |
|---|---|---|---|
| 2002/0100017 A1* | 7/2002 | Grier et al. | 717/120 |
| 2004/0039827 A1* | 2/2004 | Thomas et al. | 709/228 |
| 2005/0273850 A1* | 12/2005 | Freund | 726/14 |

* cited by examiner

*Primary Examiner*—Paul H Kang
(74) *Attorney, Agent, or Firm*—Wolf, Greenfield & Sacks, P.C.

(57) ABSTRACT

A method is provided for selectively loading a layered service provider (LSP). The method includes registering at least one category for an installed LSP and registering a list of permitted categories of LSPs for an installed application. The application is then loaded, and the list of permitted categories of LSPs for the installed application is read. The installed LSP is loaded only if the at least one category is included in the list of permitted categories of LSPs.

20 Claims, 6 Drawing Sheets

SELECTIVE EXCLUSION OF LSPS ON A PER-PACKET BASIS

FIELD OF THE INVENTION

This invention pertains generally to network communication, and more particularly to selectively including layered service providers on a per-application basis.

BACKGROUND OF THE INVENTION

Windows sockets is a popular network programming interface that is widely used by applications. Windows sockets enable third party code (called Layered Service Providers or LSPs) to be inserted in all applications (that use the Windows socket interface) by means of another interface called Service Provider Interface (SPI). There is currently no mechanism available to selectively include/exclude LSPs on a per application/per process basis. This is problematic because ALL LSPs installed on the system get included in ALL applications even though they may be interested only in traffic from certain applications. This also results in instability of the system and much customer pain, since any LSP installed on the system also gets included in System Critical Services (SCS).

SUMMARY OF THE INVENTION

In view of the foregoing, a method and computer product are provided for selectively loading a layered service provider (LSP). The method includes registering at least one category for an installed LSP and registering a list of permitted categories of LSPs for an installed application. The application is then loaded, and the list of permitted categories of LSPs for the installed application is read. The installed LSP is loaded only if the at least one category is included in the list of permitted categories of LSPs. The installed LSP may further only be loaded if all categories registered for the installed LSP are included in the list of permitted categories of LSPs.

In accordance with one embodiment of the invention, the at least one category is a content filter category for LSPs that inspect data within a request, and determine whether to continue the call to a next layer or fail the request to a previous layer. The at least one category may further be a redirector category for LSPs that map a destination address provided by an application to a different destination address controlled by a Redirector LSP. The at least one category may further be a proxy category for LSPs that redirect all traffic to a proxy server. The at least one category may further be a firewall category for LSPs that examine a connection request from a remote peer, and decide whether to continue the connection request up to a next layer.

In accordance with another embodiment of the invention, the at least one category is an inbound-modify category for LSPs that modify data received from a remote peer before it is handed to an application. The at least one category may further be an outbound-modify category for LSPs that modify data from an application before sending it to a remote peer. The at least one category may further be a crypto-compress category for LSPs that negotiate a mechanism by which data will be either compressed or decrypted during communication with a remote peer. The at least one category may further be a local-caching category for LSPs that intercepts a data request and services the request locally, rather than sending the request to a server. The at least one category may further be a system category for LSPs that are acceptable for use in System Critical Services.

In accordance with another embodiment of the invention if the system category is included in the list of permitted categories of LSPs, the at least one category must be the system category. The at least one category may further be an all-other category for LSPs that do not declare a category.

In accordance with another embodiment of the invention a method for selectively loading a layered service provider (LSP) is provided. The method includes registering at least one category for an installed LSP; registering a list of permitted categories of LSPs for a plurality application categories, loading an application, determining that the application belongs to one of the plurality of application categories, reading the list of permitted categories of LSPs for the determined application category, and loading the installed LSP only if the at least one category is included in the list of permitted categories of LSPs. The method may further comprise loading the installed LSP only if all categories registered for the installed LSP are included in the list of permitted categories of LSPs.

In one embodiment of the invention, the plurality of application categories includes a bootstrap category for applications that must perform socket operations in order to establish further network connectivity, a local-only category for applications that communicate using sockets only with other processes on a local machine and are not already classified as "bootstrap", a system-remote category for applications that are run under a SYSTEM-level account and are not already classified as "bootstrap" or "local-only", a non-interactive category for applications running under lower-privileged accounts which do not have a SECURITY_INTERACTIVE_RID in its process token and are not already classified as "boostrap", "local-only" or "SYSTEM-Remote", and an all-others for applications that do not to any other category.

In yet another embodiment of the invention, the above-described methods are embodied on a computer-readable medium having thereon computer-executable instructions for performing these methods.

Additional features and advantages of the invention are made apparent from the following detailed description of illustrative embodiments that proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1A:
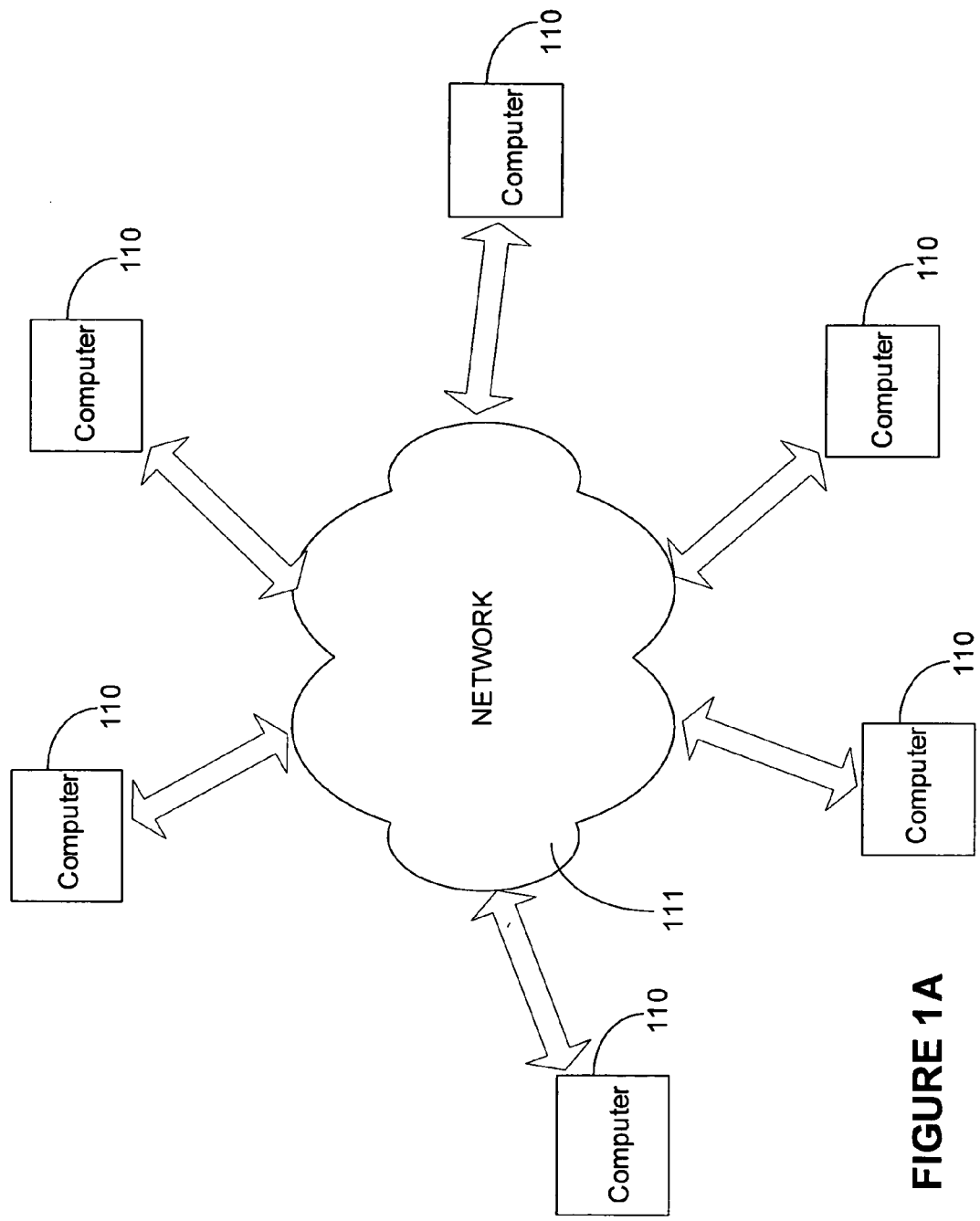
FIG. 1A is a schematic generally illustrating an exemplary network environment across which the present invention operates.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that the various acts and operations described hereinafter may also be implemented in hardware.

An example of a networked environment in which the invention may be used will now be described with reference to FIG. 1A. The example network includes several computers 110 communicating with one another over a network 111, represented by a cloud. Network 111 may include many well-known components, such as routers, gateways, hubs, etc. and allows the computers 110 to communicate via wired and/or wireless media. When interacting with one another over the network 111, one or more of the computers may act as clients, network servers, or peers with respect to other computers. Accordingly, the various embodiments of the invention may be practiced on clients, network servers, peers, or combinations thereof, even though specific examples contained herein do not refer to all of these types of computers.

Figure 1B:
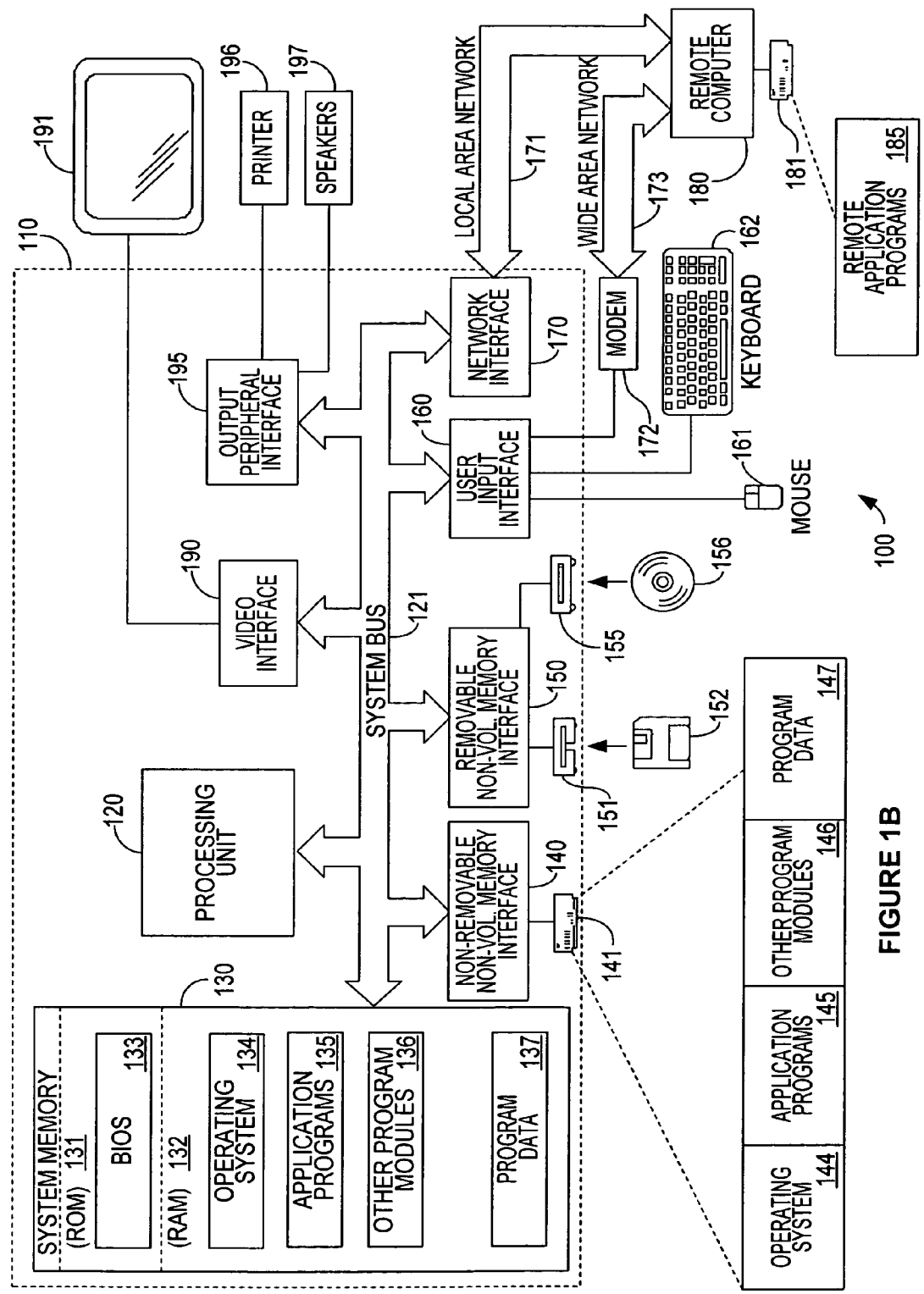
FIG. 1B is a block diagram generally illustrating an exemplary computer system on which the present invention resides.

FIG. 1B illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary computing environment 100.

The invention is operational with numerous other general-purpose or special-purpose computing system environments or configurations. Examples of well known computing systems, environments, and configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer-storage media including memory-storage devices.

With reference to FIG. 1B, an exemplary system for implementing the invention includes a general-purpose computing device in the form of a computer 110, which may act as a client, network server, quarantine server, or peer within the context of the invention. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture bus, Micro Channel Architecture bus, Enhanced ISA bus, Video Electronics Standards Associate local bus, and Peripheral Component Interconnect bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communication media. Computer storage media include both volatile and nonvolatile, removable and non-removable media implemented in any method or technology for the storage of information such as computer-readable instructions, data structures, program modules, or other data. Computer storage media include, but are not limited to, RAM, ROM, EEPROM, flash memory or other memory technology, CD-ROM, digital versatile disks or other optical disk storage, magnetic cassettes, magnetic tape, magnetic disk storage or other magnetic storage devices, or any other medium which can be used to store the desired information and which can be accessed by the computer 110. Communication media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communication media include wired media such as a wired network or direct-wired connection and wireless media such as acoustic, RF, infrared, and other wireless media. Combinations of the any of the above should also be included within the scope of computer-readable media.

The system memory 130 includes computer storage media in the form of volatile and nonvolatile memory such as read only memory (ROM) 131 and random access memory (RAM) 132. A basic input/output system 133 (BIOS), containing the basic routines that help to transfer information between elements within the computer 110, such as during start-up, is typically stored in ROM 131. RAM 132 typically contains data and program modules that are immediately accessible to or presently being operated on by the processing unit 120. By way of example, and not limitation, FIG. 1B illustrates an operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile, magnetic media, a magnetic disk drive 151 that reads from or writes to a removable, nonvolatile, magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary computing environment 100 include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as the interface 140, and the magnetic disk drive 151 and the optical disk drive 155 are typically connected to the system bus 121 by a removable memory interface, such as the interface 150.

The drives and their associated computer storage media discussed above and illustrated in FIG. 1B provide storage of computer-readable instructions, data structures, program modules, and other data for the computer 110. In FIG. 1B, for example, the hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers to illustrate that, at a minimum, they are different copies.

A user may enter commands and information into the computer 110 through input devices such as a keyboard 162 and a pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus. A monitor 191 or other type of display device is also connected to the system bus 121 via an interface, such as a video interface 190. In addition to the monitor 191, the computer 110 may also include other peripheral output devices such as speakers 197 and a printer 196 which may be connected through an output peripheral interface 195.

The computer 110 operates in a networked environment using logical connections to one or more remote computers, such as a remote computer 180. The remote computer 180 may be a personal computer, a server, a router, a network PC, a peer device, or other common network node and typically includes many or all of the elements described above relative to the personal computer 110 although only a memory storage device 181 has been illustrated in FIG. 1B. The logical connections depicted in FIG. 1B include a local area network (LAN) 171 and a wide area network (WAN) 173 but may also include other networks. Such networking environments are commonplace in offices, enterprise-wide computer networks, intranets, and the Internet. Furthermore, LAN 171 includes both wired and wireless connections.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the personal computer 110, or portions thereof, may be stored in the remote memory storage device 181. By way of example, and not limitation, FIG. 1B illustrates the remote application programs 185 as residing on the memory device 181. It will be appreciated that the network connections shown are exemplary, and other means of establishing a communications link between the computers may be used.

To communicate over the Internet, Microsoft Windows provides a programming interface called Winsock, which mediates communication between applications and the Internet transport protocols. Winsock provides a Service Provider Interface (SPI) for creating Winsock services, commonly referred to as the Winsock SPI. Two types of service providers exist: transport providers and namespace providers. Examples of transport providers include protocol stacks such as TCP/IP or IPX/SPX, while an example of a namespace provider would be an interface to the Internet's Domain Naming System (DNS). Separate sections of the service provider interface specification apply to each type of service provider. Transport and namespace service providers are registered with the Ws2_32.dll at the time they are installed. This registration need only be done once for each provider as the necessary information is retained in persistent storage.

Windows Sockets transport and namespace service providers are DLLs with a single exported procedure entry point for the service provider initialization function: WSPStartup or NSPStartup, respectively. All other service provider functions are made accessible to the Ws2_32.dll through the service provider's dispatch table. Service provider DLL's are loaded into memory by the Ws2_32.dll only when needed, and are unloaded when their services are no longer required.

Transport service providers can be broadly divided into two categories: those whose socket descriptors are real file system handles (and are hereafter referred to as Installable File System (IFS) providers); the remainder are referred to as non-IFS providers. The Ws2_32.dll passes the transport service provider's socket descriptor on up to the Windows Sockets application, so applications are free to take advantage of socket descriptors that are file system handles if they so choose.

A given transport service provider supports one or more protocols. For example, a TCP/IP provider would supply, as a minimum, the TCP and UDP protocols, while an IPX/SPX provider might supply IPX, SPX, and SPX II. Each protocol supported by a particular provider is described by a WSAPROTOCOL_INFO structure, and the total set of such structures can be thought of as the catalog of installed protocols. Applications can retrieve the contents of this catalog (for more information, see WSAEnumProtocols), and by examining the available WSAPROTOCOL_INFO structures, discover the communications attributes associated with each protocol.

Windows Sockets 2 accommodates the concept of a layered service provider. A layered service provider is one that implements only higher level communications functions, while relying on an underlying transport stack for the actual exchange of data with a remote endpoint. An example of such a layered service provider would be a security layer that adds protocol to the connection establishment process in order to perform authentication and to establish a mutually agreed upon encryption scheme. Such a security protocol would generally require the services of an underlying reliable transport protocol such as TCP or SPX. The term base service provider refers to a protocol such as TCP or SPX which is fully capable of performing data communications with a remote endpoint, and the term layered service provider is used to describe a protocol that cannot stand alone. A service provider chain would then be defined as one or more layered protocols strung together and anchored by a base protocol. This stringing of layered service providers and base service providers into chains can be accomplished by arranging for the layered service providers to support the Winsock SPI at both their upper and lower edges.

Figure 2:
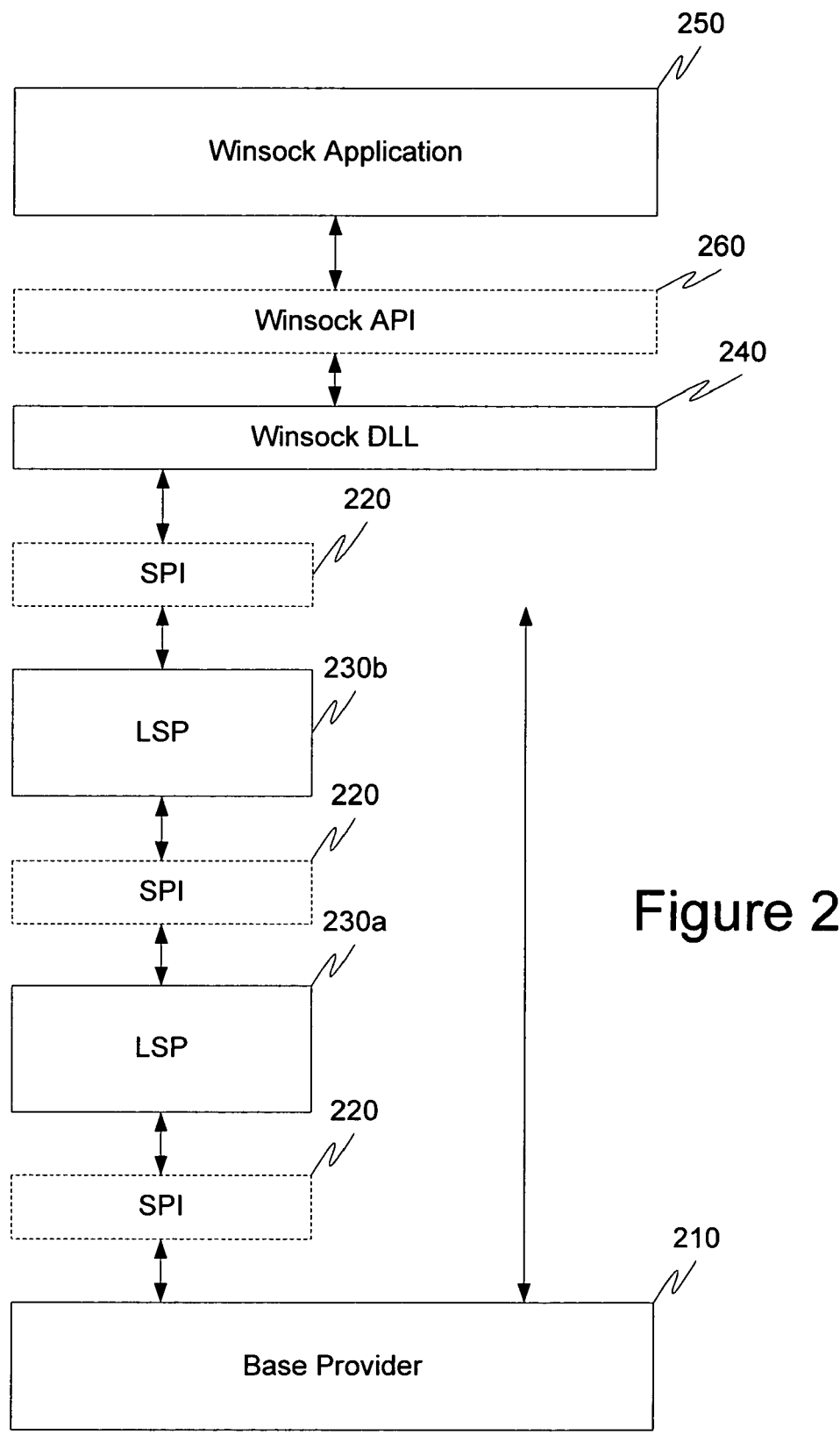
FIG. 2 illustrates the Winsock-Layer Service Provider hierarchy.

FIG. 2 illustrates a block diagram that illustrates the concept of layered service providers (LSPs). Base service provider 210 is an underlying transport protocol such as TCP or SPX. Base service provider 210 performs data communications with a remote endpoint. Base service provider typically communicates directly with the Windsock DLL 240. However, when an LSP is installed, the LSP may read and in some cases modify data communications, received from the base service provider 210, before pass them up to the Winsock DLL 240. In the exemplary environment of FIG. 2, base service provider 210 passes data to LSP 230a through the Winsock SPI 220. LSP 230a may then pass that data up to another installed LSP 230b through the Winsock SPI 220. Ultimately, the received data is passed to the Winsock DLL 240 through the Winsock SPI 220. The Winsock DLL 240 makes the data available to Winsock Application 250 through the Winsock API 260. The Winsock Application 250 is blind to the implementation of the base and layered service providers, and requests and receives data communications using only the Winsock API 260.

Conventionally, when a Winsock application or process is initiated, a call is made to WSPStartup, and the DLLs for all installed LSPs are loaded. However, it is desirable to selectively load LSPs based on those that will actually used, and those that are permitted. Accordingly, various embodiments of the invention described herein provide a taxonomy for classifying LSPs into categories such that LSPs may be categorically included/excluded on a per-application or per-process basis. Further provided is a mechanism for selectively including/excluding the LSPs, and exemplary interfaces for an LSP to register its category, and for an application to include/exclude LSP categories.

In the proceeding description, an exemplary taxonomy for classifying LSPs into categories is provided in accordance with one embodiment of the invention. Those of ordinary skill in the art will recognize that additional categories may be added to the taxonomy, and likewise, advantages of the invention will be realized so long as at least two categories are included in the taxonomy.

Content-Filter

A Content-Filter LSP is typically implemented to inspect data within a request, and to determine whether to continue the call to the next layer or fail the request to the previous layer. This inspection typically takes the form of evaluating the contents of HTTP Request or SMTP message headers before they are sent to the server, or inspecting SMTP or IM headers as they are received from a remote peer. Thus, the Content-Filter LSP will typically handle WSPSend and WSPRecv operations. Since the inspecting Content-Filter will not modify the content, it will handle these two SPI functions as read-only (RO).

Redirector

A Redirector LSP typically performs its work by mapping the destination addresses provided by an application to a different set of destination addresses controlled by the Redirector LSP. This means that the LSP will handle SPI calls that have destination addresses in their parameters. The LSP then changes the parameters before continuing the call to the next layer. Therefore, the Redirector LSP will typically handle WSPConnect operations and datagram SPIs that take destination addresses, such as WSPSendTo and WSPRecvFrom. Because it modifies the parameters, it will handle these SPI functions as read-write (RW).

Proxy

A Proxy LSP typically redirects all traffic to a proxy server, but also communicates with the proxy server for connection establishment and teardown SPIs. This includes coordinating with the proxy server to support acceptance of connections on listening sockets. Therefore, the a Proxy LSP will typically handle all the operations a Redirector LSP will handle, and additionally the WSPBind, WSPListen and WSPCloseSocket SPIs. For all of these functions, in addition to modifying the destination address, the Proxy LSP will coordinate with the proxy server in the handling of these functions by sending control signaling (CS) data between the client and proxy server.

Firewall

Firewall LSP typically examines connection requests from remote peers, and decides whether to continue the connection request up to the next layer (towards the application). Therefore the Firewall LSP will handle connection accepting SPIs during call completion. The Firewall LSP will handle WSPAccept, WSPConnect, WSPBind and WSPListen and decide whether to complete the operation to the upper layer, or silently decline the connection request (thus tearing down the connection). This decision does not require modification of parameters, therefore the operations will be handled RO.

Inbound-Modify

An Inbound-Modify LSP typically modifies the data received from remote peers before it is handed to the application. Therefore this LSP will handle data reception SPIs during call completion. At a minimum, the LSP will handle WSPRecv, and optionally handle WSPRecvFrom and the WSARecvMsg extension function. Since the received data is modified, these SPIs will be handled RW.

Outbound-Modify

Similar to Inbound-Modify, Outbound-Modify LSPs modify data from the application before sending it to remote peers. Therefore this LSP will handle data transmission SPIs during the initial call, ignoring the completion to the upper layer. Minimally, the LSP will handle WSPSend, and optionally handle WSPSendTo, WSPSendDisconnect and the WSASendMsg extension function. Since the data will be modified, these SPIs will be handled RW.

Crypto-Compress

A Crypto-Compress LSP negotiates a mechanism by which the data will be either compressed or decrypted during communication with a remote peer. This negotiation typically happens immediately following connection establishment for stream connections, or on each receive or send for datagram connections. The negotiation may take the form negotiating a session key in the case of encryption/decryption, or negotiating the specific compression algorithm in the case of compression. Once the negotiation is complete, the LSP will modify both inbound and outbound data. Therefore, in addition to performing all of the actions of Inbound-Modify and Outbound-Modify LSPs, the Crypto-Compress LSP performs control signaling (the negotiation phase) for connection SPIs.

Local-Caching

A Local-Caching LSP intercepts specific data requests (possibly interpreting higher level protocols flowing over the connection) and services those requests locally, rather than sending the request to the server. By doing this the LSP can provide an application-independent mechanism for caching response data from a remote server. Therefore the Local-Caching LSP will typically intercept and parse requests sent by the application, and either continue the request to the next layer, or drop the request and simulate the network activity of receiving the response. For parsing the requests, the LSP would handle (read-only) WSPSend, and optionally the other data sending SPI functions WSPSendTo, WSPSendDisconnect and the WSASendMsg extension function. For simulating the response data, the LSP would perform extra processing and/or control signaling (i.e., coordinating with the locally cached data), simulate select( ) events, and RW handling of WSPRecv calls.

System

A System LSP is acceptable for use in System Critical Services. Unless this category is selected, an LSP should be excluded from all SCS.

All-Other

When an LSP does not declare its class, it defaults to this category. This category is independent of the set of SPIs handled by the LSP.

LSP authors must declare the categories to which an LSP belongs. This information should be provided as meta-data during the LSP installation process. The LSP author could declare the categorization information for the LSP in a component manifest which would be processed by the Windows Component Based Installer. The LSP meta-data is persisted in the Winsock Catalog, such that all entries for a given LSP could efficiently retrieve the meta-data. If an LSP does not declare its membership in any LSP Category, Winsock will assume the LSP to be a member of the All-Others LSP Category. This proposed LSP Category list is not exhaustive. Additional LSP Categories may be created as the need arises.

In order to decide whether an LSP should be used by a given process, an embodiment of the invention provides a mechanism for identifying Applications via a persistent, immutable identifier (AppID), and a set of mutually exclusive Application Categories which are defined by which LSP Categories are permissible for each Application Category. In this embodiment of the invention, every application installed on a computer system provides a set of APIs to discover an application-specific, version independent, unique identifier for the application. This identifier is know as an AppID, and is a GUID. An application's AppID can be discovered at run time (from within the process) and offline (by a path to the executable image).

System Critical Services (SCSs) are those which run as a highly privileged user and are essential to the proper functioning of the operating system. Some SCSs have the additional property that they cannot be stopped and restarted. In order to protect System Critical Services that use Winsock, a primary classification for Application Categories is limited to differentiating SCSs and establishing which LSP Categories should be permitted (or prohibited) from the different SCSs. Some common SCSs are as follows:

Bootstrap: Services or Applications which must perform socket operations in order to establish further network connectivity for this machine (e.g., DHCP).

Local-Only: Services or Applications which communicate using sockets only with other processes on the local machine and are not already classified as "Bootstrap".

SYSTEM-Remote: Processes which are run under a SYSTEM-level account and are not already classified as "Bootstrap" or "Local-Only".

Non-Interactive: Processes running under lower-privileged accounts which do not have the SECURITY_INTERACTIVE_RID in its process token and are not already classified as "Boostrap", "Local-Only" or "SYSTEM-Remote". These are typically services attempting to run with Least User Access (LUA).

All-Others: All process not belonging to other categories.

In accordance with this embodiment of the invention, an application must declare itself to be a member of one of the mutually exclusive Application Categories. The AppID and declared Application Category are then persisted in the Winsock Catalog such that the Winsock infrastructure can discover its Application Category at run time. If an AppID is not found in the Winsock Catalog, the application is assumed to be a member of the All-Others group. Therefore, the list of process in the All-Others group does not need to be persisted in the Winsock Catalog. Additionally, if an application does not explicitly declare itself to be a member of any Application Category, it defaults to the All-Others category.

Figure 3:
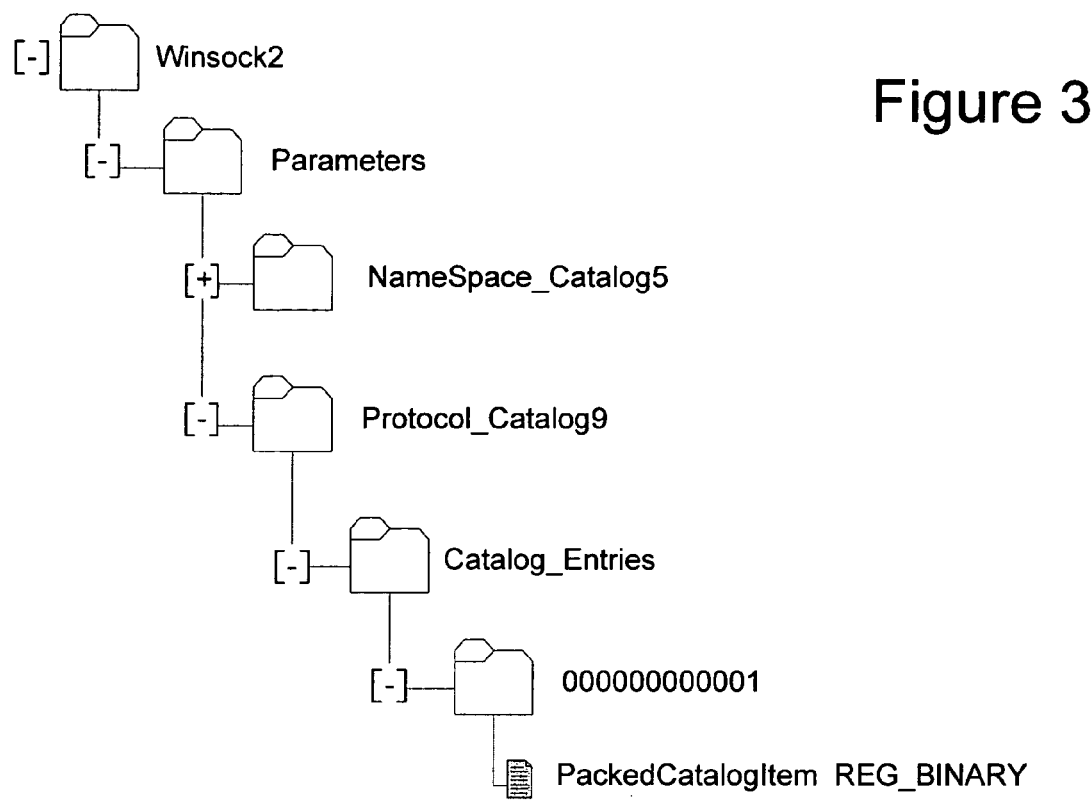
FIG. 3 illustrates an exemplary conventional Winsock Catalog in the registry.
Figure 4:
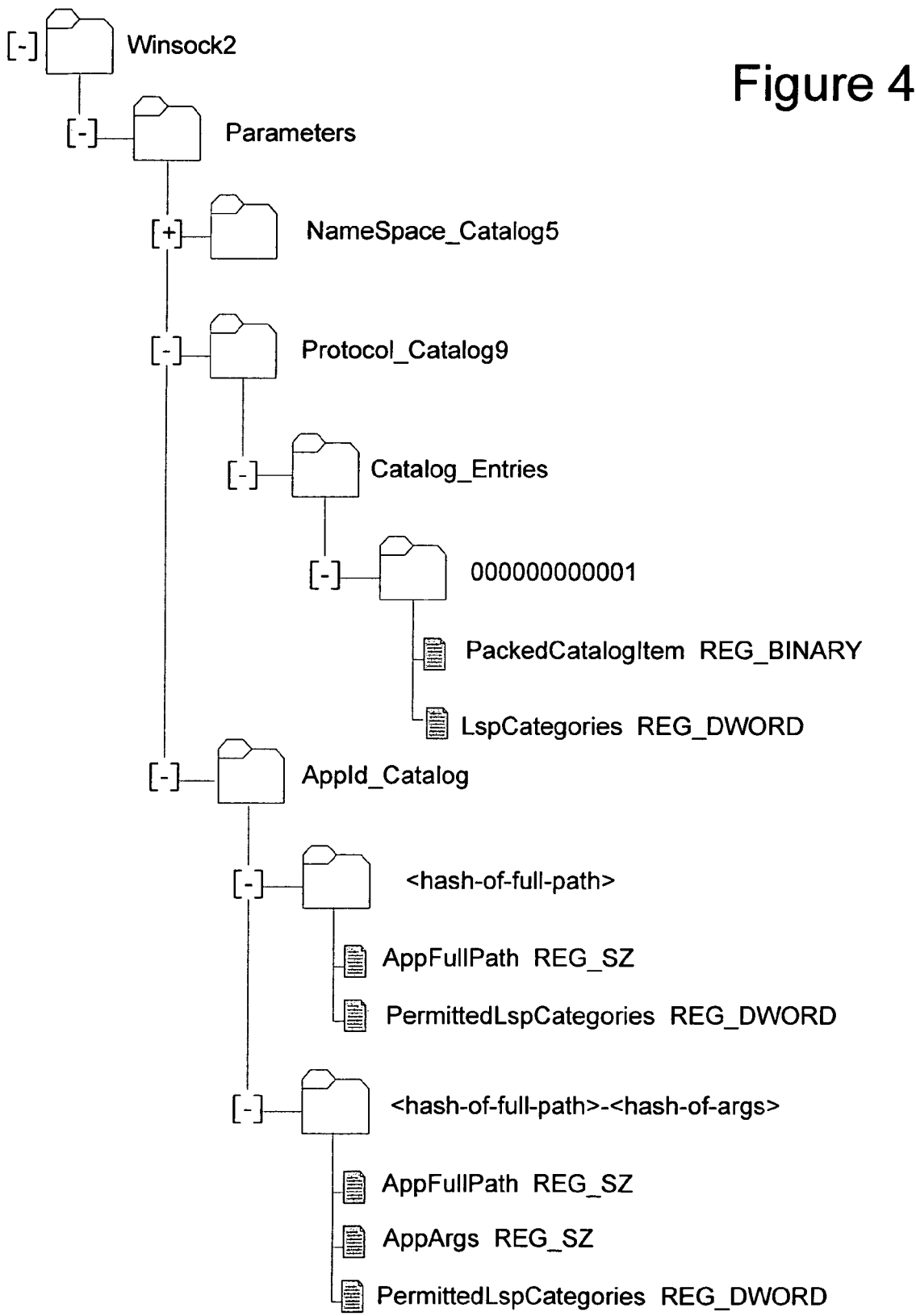
FIG. 4 illustrates an exemplary Winsock Catalog in the registry in accordance with the present invention.

FIG. 3 illustrates an exemplary conventional Winsock Catalog in the registry of a machine running Windows XP. The Protocol_Catalog9 includes the catalog entries for all of the registered LSPs. In this case, only one LSP is registered (000000000001), however an unlimited number of LSPs may be registered. FIG. 4 illustrates the exemplary Winsock Catalog of FIG. 3 with the advantages provided by embodiments of the present invention. Each registered LSP in this invention includes a registry entry enumerating the LSP categories under which it is classified. Further, the Winsock Catalog now includes an AppID Catalog. The AppID catalog details the LSPs that are permitted to load for each particular application installed. FIG. 4 will be described in greater detail herein.

Once a set of LSP Categories is known for an LSP, and the Application Category of the current process is known, the invention may then decide if the LSP should be permitted in the current process. There are at least two possible ways to define Process Categories: by prohibition or by inclusion. Prohibition states that a particular LSP Category is prohibited from an Application Category. Inclusion states that an Application Category requires all LSPs that are members of a particular LSP Category, regardless of the other LSP Categories an LSP belongs.

Consider the exemplary case of an LSP which provides SSL functionality. By definition, it would be a member of the LSP Categories Inbound-Modify, Outbound-Modify and Crypto-Compression. Under the prohibitive definition of the Bootstrap Application Category, this LSP would be excluded. However, under the inclusive definition, the LSP would be included in the category.

In one embodiment of the invention, LSP selection is based upon the prohibitive definition of Application Categories. Table 1 shows the effective result of the prohibitive definition for the following "permissible" LSP categories for each App Category. During the first call to WSAStartup, the App Category membership of the current process is determined, and then a set of LSPs that are permitted for the App Category is enumerated. During the first call to read the Winsock Catalog, the Winsock code modifies its in-memory form of the Winsock Catalog and removes any LSPs which are not permitted for the current process. Additionally, the Winsock code ensures that all remaining LSPs are properly chained.

TABLE 1

Prohibitive Application Category Definition

|  |  | Application Categories | | | |
|---|---|---|---|---|---|
|  |  | Bootstrap/ Local-Only | System-Remote | Non-Interactive | All-Others |
| LSP Categories | Content Filter |  |  | ✓ | ✓ |
|  | Redirector |  | ✓ | ✓ | ✓ |
|  | Proxy |  | ✓ | ✓ | ✓ |
|  | Firewall | ✓ | ✓ | ✓ | ✓ |
|  | Inbound-Modify |  |  | ✓ | ✓ |
|  | Outbound-Modify |  |  | ✓ | ✓ |
|  | Crypto/Compress | ✓ | ✓ | ✓ | ✓ |
|  | Local Caching |  |  | ✓ | ✓ |
|  | System | ✓ | ✓ | ✓ | ✓ |

Figure 5:
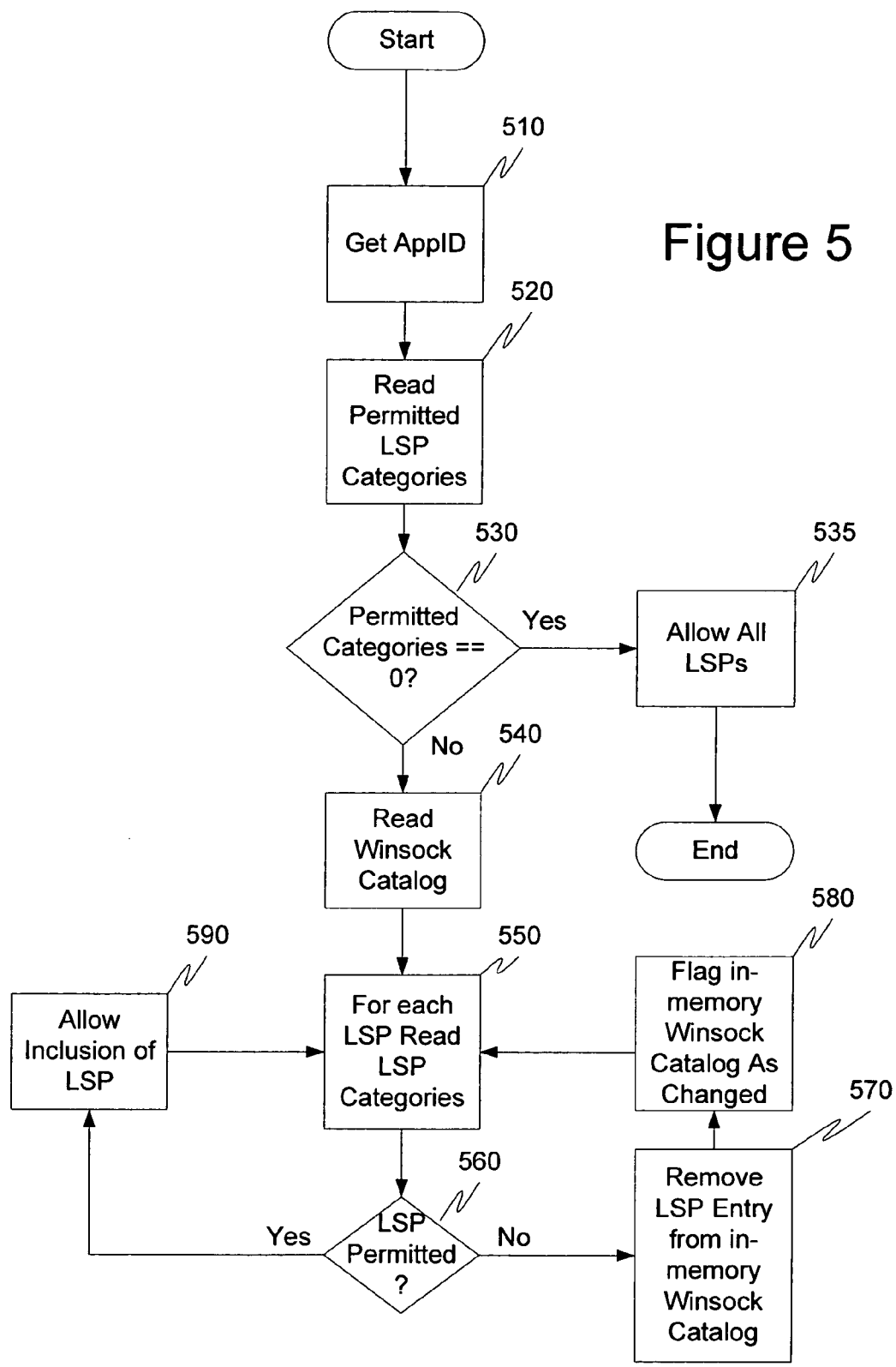
FIG. 5 is a flow diagram illustrating a method of selective inclusion of LSPs in accordance with the present invention.

The proceeding description describes the mechanisms for identifying application instances and the algorithms for filtering the Winsock Catalog for a given application instance, in accordance with an embodiment of the invention. As illustrated in FIG. 4, for each LSP entry, a new value 'LspCategories' that is a collection of flags stored in a DWORD is added. Each flag represents an LSP Category. For each AppID, a new value 'PermittedLspCategories', which is a collection of flags stored in a DWORD, is added. Inclusion of an LSP in a given Application instance is determined as follows with reference to FIG. 5. At step 510, look up the AppID in the Winsock Catalog. At step 520, read the PermittedLspCategories. If, at step 530, PermittedLspCategories is not present, assume a value of zero (0) and stop selective inclusion evaluation and allow all LSPs at step 535. At step 540, read the Winsock Catalog-Provider Catalog into memory. For each LSP Dummy Entry, at step 550, read the LspCategories. An LSP (and all of its chains) will be permitted if ALL of the following are true:

1. At least one of the categories specified in LspCategories is specified in PermittedLspCategories;
2. ONLY categories specified in PermittedLspCategories are specified in LspCategories; and
3. If the LSP_SYSTEM category is specified in PermittedLspCategories, then it MUST be specified in LspCategories. If an LSP is not permitted at step 560, remove the LSP dummy entry and all relevant LSP chains from the IN-MEMORY Winsock Catalog at step 570. Then, flag the in memory form of the catalog such that it will not be flushed back to the registry at step 580. The catalog entries that have been removed may be tracked, such that subsequent updates/notifications for those entries can be ignored. Otherwise, the LSP is allowed at step 590.

By way of example, Assuming the following LSP category definitions:

```
#define LSP_SYSTEM          0x80000000
#define LSP_INSPECTOR       0x00000002
#define LSP_FIREWALL        0x00000010
#define LSP_CRYPTO_COMPRESS 0x00000080
```

Assuming the following category settings:

```
App 1: PermittedLspCategories 0x8000090 //(LSP_SYSTEM +
    LSP_FIREWALL + LSP_CRYPTO_COMPRESS)
LSP1: LspCategories 0x80000000 // LSP_SYSTEM
LSP2: LspCategories <not present>
LSP3: LspCategories 0x00000010 // LSP_FIREWALL
LSP4: LspCategories 0x80000092 // (LSP_SYSTEM +
    LSP_FIREWALL + LSP_CRYPTO_COMPRESS +
    LSP_INSPECTOR)
```

In this example, App1 would permit only LSP1. LSP2 would be eliminated because it did not meet criteria 1 above. LSP3 would be eliminated because it did not meet criteria 3 above. LSP4 would be eliminated because it did not meet criteria 2 above (LSP_INSPECTOR not in PermittedLspCategories).

As previously mentions, FIG. 4 illustrates a registry schema for persisting an application category in the Winsock Catalog, in accordance with an embodiment of the invention. The <hash-of-full-path> is a 32-bit hex representation, and is calculated from a case-insensitive value of the full path of the executable. The <hash-of-args> is also a 32-bit hex representation. It is calculated as a case sensitive value, ignoring any spaces between arguments. Spaces included within quoted arguments will be counted. For entries which do not include the command arguments, the key name will be only the <hash-of-full-path>. For entries that specify command arguments, the key name will be <hash-of-full-path>, plus a delimiting hyphen character ('-'), plus <hash-of-args>. The <hash-of-full-path> and <hash-of-args> values function as the key lookup value for the catalog. There must not be duplicate entries for a given AppFullPath and AppArgs value. If there is a hash collision, the trailing hash element value will be incremented by one. The AppArgs value will not be present for entries with a key value of only <hash-of-full-path>.

Following are exemplary Winsock APIs for LSP authors, in accordance with an embodiment of the invention:

APIs for LSP Authors

```
typedef enum _WSC_PROVIDER_INFO_TYPE {
    // InfoType is: Info points to:
    (...)
    ProviderInfoLspCategories,  // DWORD (LspCategories)
    ProviderInfoAudit,          // struct
    WSC_PROVIDER_AUDIT_INFO
    (...)
} WSC_PROVIDER_INFO_TYPE ;
WSCSetProviderInfo(
    _in LPGUID lpProviderId,
    _in WSC_PROVIDER_INFO_TYPE InfoType,
    _in_bcount(InfoSize) PBYTE Info,
    _in size_t InfoSize,
    _in DWORD Flags
    ) ;
WSCGetProviderInfo(
    _in LPGUID lpProviderId,
    _in WSC_PROVIDER_INFO_TYPE InfoType,
    _out_bcount_part(*InfoSize, *InfoSize) PBYTE Info,
    _inout size_t *InfoSize,
    _in DWORD Flags
    ) ;
```

APIs for Application & System Critical Service Authors

```
WSCSetApplicationCategory(
    _in_ecount(PathLength) LPWSTR Path,
    size_t PathLength,
    _in_ecount(ExtraLength) LPWSTR Extra,
```

-continued

```
        size_t ExtraLength,
        DWORD PermittedLspCategories,
        _opt DWORD * pPrevPermLspCat
        )
    WSCGetApplicationCategory(
        _in_ecount(PathLength) LPWSTR Path,
        size_t PathLength,
        _in_ecount(ExtraLength) LPWSTR Extra,
        size_t ExtraLength,
        _out DWORD * pPermittedLspCategories
    )
```

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. In a computer comprising a processor and computer-executable instructions that when executed by the processor perform a method for selectively loading a layered service provider (LSP), the method comprising:
   identifying a plurality of categories for layered service providers (LSPs) based on a set of functions performed by the LPSs;
   registering at least one category of the plurality of categories for an installed LSP;
   registering a list of permitted categories of LSPs for an installed application;
   loading the installed application;
   reading the list of permitted categories of LSPs for the installed application; and
   selecting the installed LSP to be loaded only if the at least one category of the installed LSP is included in the list of permitted categories of LSPs.

2. The method of claim 1, wherein the at least one category of the installed LSP includes more than one category, the method further comprising selecting the installed LSP to be loaded only if all categories of the more than one category registered for the installed LSP are included in the list of permitted categories of LSPs.

3. The method of claim 1, wherein the at least one category is a content filter category for LSPs that inspect data within a request, and determine whether to continue a call to a next layer or fail the request to a previous layer.

4. The method of claim 1, wherein the at least one category is a redirector category for LSPs that map a destination address provided by an application to a different destination address controlled by a redirector LSP.

5. The method of claim 1, wherein the at least one category is a proxy category for LSPs that redirect all traffic to a proxy server.

6. The method of claim 1, wherein the at least one category is a firewall category for LSPs that examine a connection request from a remote peer, and decide whether to continue the connection request up to a next layer.

7. The method of claim 1, wherein the at least one category comprises at least one of is an inbound-modify category for LSPs that modify data received from a remote peer before it is handed to an application and an outbound-modify category for LSPs that modify data from an application before sending it to a remote peer.

8. The method of claim 1, wherein the at least one category is a crypto-compress category for LSPs that negotiate a mechanism by which data will be either compressed or decrypted during communication with a remote peer.

9. The method of claim 1, wherein the at least one category is a local-caching category for LSPs that intercepts a data request and services the request locally, rather than sending the request to a server.

10. The method of claim 1, wherein the at least one category is a system category for LSPs that are acceptable for use in System Critical Services.

11. The method of claim 10, wherein if the system category is included in the list of permitted categories of LSPs, the at least one category is the system category.

12. The method of claim 1, wherein the at least one category is an all-other category for LSPs that do not declare a category.

13. A computer-readable storage medium having thereon computer-executable instructions for performing the method of claim 1.

14. In a computer comprising a processor and computer-executable instructions that when executed by the processor perform a method for selectively loading a layered service provider (LSP), the method comprising:
   registering at least one category for an installed LSP, wherein the at least one category is identified based on a set of functions performed by the installed LSP;
   registering permitted categories of layered service providers (LSPs) for each application category of a plurality of application categories;
   loading an application;
   determining that the application belongs to a category of the plurality of application categories;
   reading a list of permitted categories of LSPs for the determined category of the application; and
   loading the installed LSP only if the at least one category is included in the list of permitted categories of LSPs.

15. The method of claim 14, further comprising loading the installed LSP only if all categories registered for the installed LSP are included in the list of permitted categories of LSPs.

16. The method of claim 14, wherein the plurality of application categories includes at east one of a bootstrap category for applications that performs socket operations in order to establish further network connectivity,
   a local-only category for applications that communicate using sockets only with other processes on a local machine and are not already classified as "bootstrap",
   a system-remote category for applications that are run under a SYSTEM-level account and are not already classified as "bootstrap" or "local-only",
   a non-interactive category for applications running under lower-privileged accounts which do not have a SECURITY_INTERACTIVE_RID in its process token and are not already classified as "bootstrap", "local-only" or "SYSTEM-Remote", and
   an all-others for applications that do not to any other category.

17. A computer-readable storage medium having thereon computer-executable instructions for performing the method of claim 14.

18. The method of claim 1, wherein the set of functions comprises a set of service provider interface (SPI) functions.

19. In a computer comprising a processor and computer-executable instructions that when executed by the processor perform a method for selectively loading a layered service provider (LSP), the method comprising:

registering a plurality of LSP categories for an installed LSP, wherein the at least one category is identified based on a set of functions performed by the installed LSP;

registering a plurality of permitted LSP categories for each application category of a plurality of application categories;

loading an application having an application category of the plurality of application categories, the application category is defined by a list of permitted LSP categories;

loading the installed LSP if each of the plurality of categories for the installed LSP is included in the list of permitted LSP categories; and excluding the installed LSP if the plurality of categories includes an LSP category that is not included in the list of permitted LSP categories.

20. The method of claim 19, wherein the plurality of LSP categories for the installed LSP are provided as meta data during installation of the installed LSP.

* * * * *